Dec. 2, 1924. 1,517,786
T. G. KUS
VALVE FOR ASCENSION PIPES AND THE LIKE
Filed July 22, 1922 2 Sheets-Sheet 1
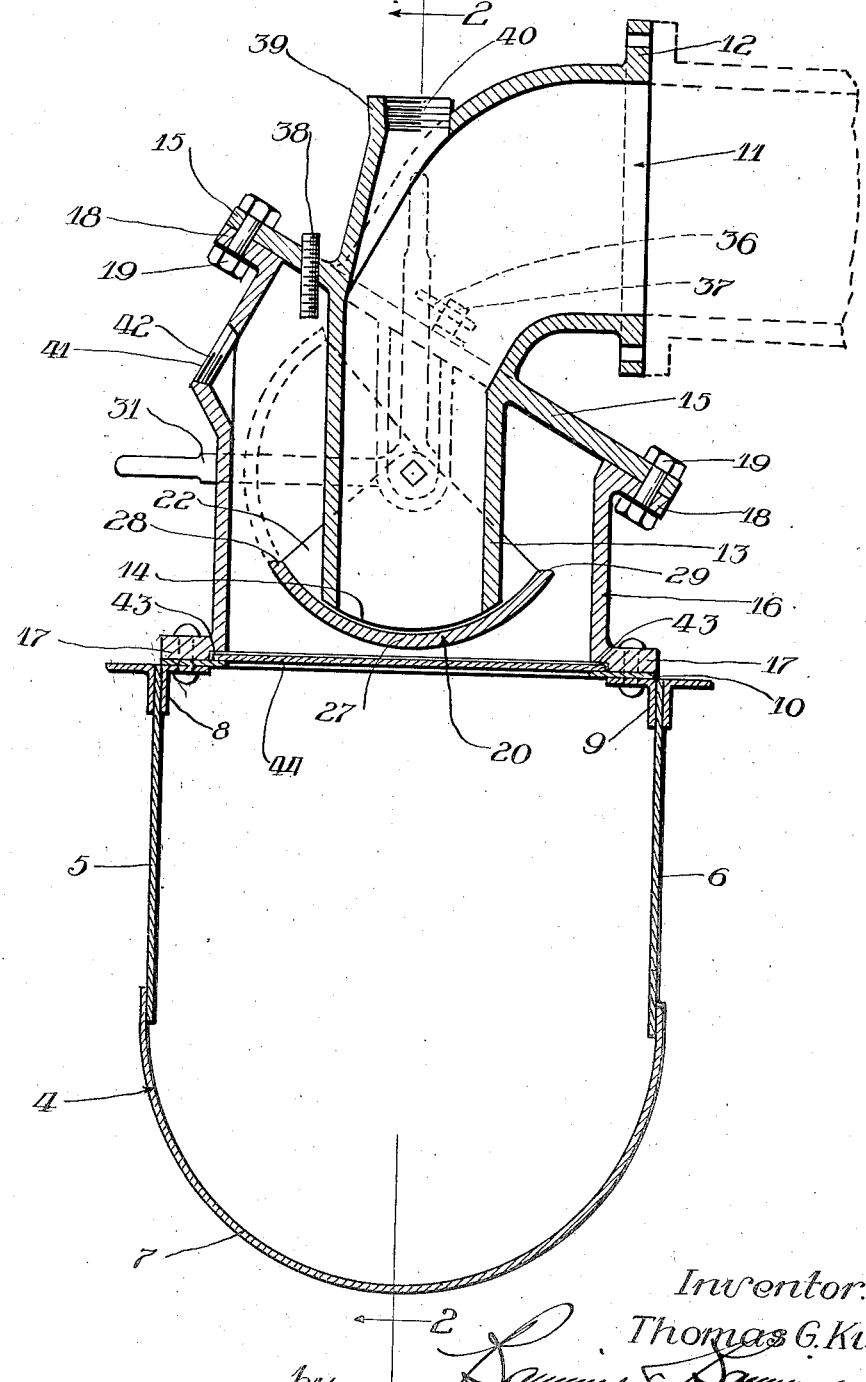

Dec. 2, 1924.

T. G. KUS 1,517,786

VALVE FOR ASCENSION PIPES AND THE LIKE

Filed July 22, 1922    2 Sheets-Sheet 2

Inventor:
Thomas G. Kus.
by
Atty's.

Patented Dec. 2, 1924.

1,517,786

UNITED STATES PATENT OFFICE.

THOMAS G. KUS, OF WINNETKA, ILLINOIS, ASSIGNOR TO AMERICAN COKE & CHEMICAL COMPANY, OF CHICAGO, ILLINOIS, A CORPORATION OF MAINE.

VALVE FOR ASCENSION PIPES AND THE LIKE.

Application filed July 22, 1922. Serial No. 576,663.

To all whom it may concern:

Be it known that I, THOMAS G. KUS, a citizen of the United States, residing at Winnetka, in the county of Cook and State of Illinois, have invented certain new and useful Improvements in Valves for Ascension Pipes and the like, of which the following is a specification.

This invention has to do with certain improvements in valves. The invention has reference particularly to certain improvements in valves for ascension pipes of gas plants and the like, but it will presently appear that the valve herein disclosed may also, in many cases, be used to advantage in other locations and for other purposes than ascension pipes. Nevertheless in view of the fact that the construction herein disclosed has been devised with special reference to the conditions existing in ascension pipes, I have illustrated and will describe the valve in this particular application, without, however, intending thereby to limit myself to this particular application of the features of the invention, except as I may limit myself in the claims.

Bearing the foregoing in mind, it will in the first place be understood that the ascension pipes establish a connection between the gas top or dome of a coke oven and the hydraulic main through which the gas is conducted away from the oven. The gas coming over from the oven carries a large amount of tar and other heavy material in either liquid or vaporized form which condenses or is deposited on the ascension pipe. This results in a gumming up of the valve itself, accompanied by the deposit of such heavy materials, such as pitch. As a result, it is often found that the valve becomes either closed or so obstructed after a period of time that it is very difficult and sometimes impossible to operate.

One of the objects of the present invention is to provide a valve of such construction that each time it is opened or closed, any foreign matter such as tar or pitch will be scraped off of it. The valve is, therefore, self-cleansing, and is kept in proper operating condition by the mere process of opening and closing it.

In this connection a further object is to so construct the valve that the pitch and other foreign matter will be removed by the cutting or scraping action, thus making it possible to operate the valve and remove this foreign matter with a minimum amount of difficulty, and with the application of a relatively small amount of operating force.

Another object of the invention is to so construct the valve that it will always effect a perfect gas seal when in closed position, this result being brought about by a liquid seal which is automatically established when the valve is closed.

In this connection a further object is to make use of the presence of the liquid tar which is ordinarily supplied to the hydraulic main for the purpose of automatically creating the liquid seal promptly after the valve has been moved into the closed position.

A still further object of the invention is to provide a valve construction such that when it is desired to remove the valve or disconnect it from the ascension pipe or from the hydraulic main, a sealing plate may be easily set in place to prevent any substantial loss of gas during the process of removing or inserting the valve and establishing the connections.

Another object of the invention is to provide a construction such that the valve and the ascension pipe may both be easily cleaned by the introduction of a rod or cleaning instrument from the outside if that should become desirable.

Other objects and uses of the invention will appear from a detailed description of the same which consists in the features of construction and combinations of parts hereinafter described and claimed.

In the drawings:

Figure 1 shows a vertical section through an ascension pipe, valve, and hydraulic main, embodying the features of the present invention;

Figure 3:
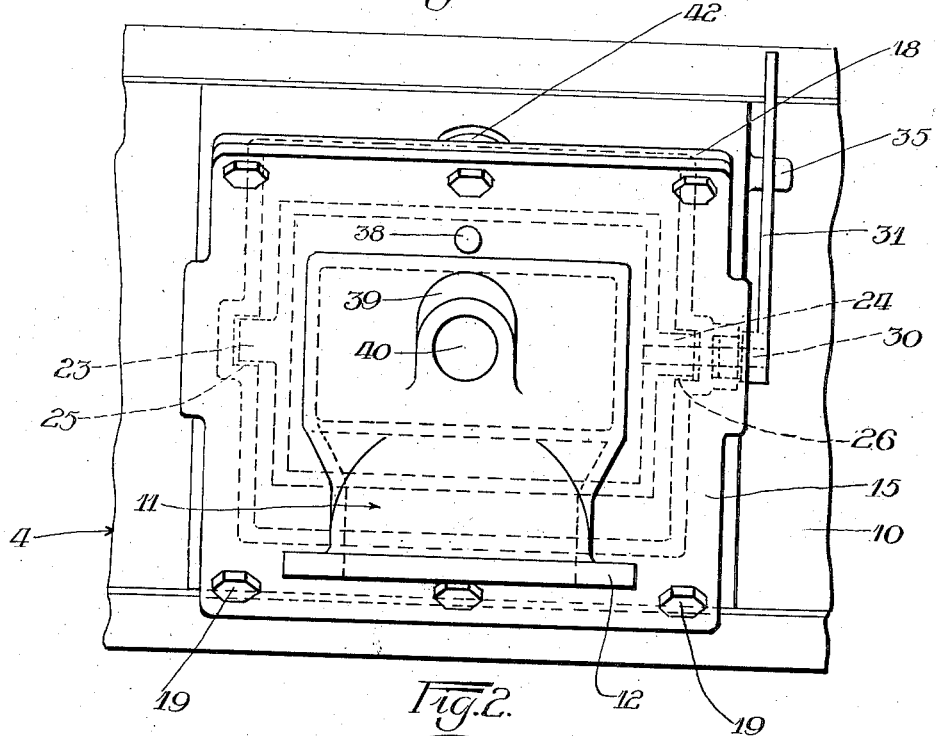
Fig. 3 shows a plan view corresponding to Figs. 1 and 2.

The hydraulic main is designated by the numeral 4. It is of the usual form including the side plates 5 and 6 and the semi-circular bottom portion 7. Angle bars 8 and 9 are provided along the upper portion of the side plates 5 and 6 to support the top plate 10 of the main.

The ascension pipe having its outer portion shown in dotted lines connects into an elbow member 11 by means of the flange 12. This elbow member 11 has a downwardly extending throat 13 at the lower end 14 of which the seal is established when the valve is closed. The elbow member 11 is also provided with an outstanding flange plate 15 which preferably lies at an angle of substantially 30 degrees to the horizontal when the connecting flange 12 is vertically positioned as shown in Fig. 1.

Surrounding the throat 13 is an upstanding neck 16, the lower end of which is provided with a flange 17 which may be riveted or otherwise secured to the top portion of the hydraulic main. Ordinarily the flange 17 will be riveted to the angle bars 8 and 9 and to the top plate 10 of the hydraulic main. The neck 16 is also provided with a flange 18 properly formed to seat evenly against the flange plate 15 of the member 11. The flange 18 and flange plate 15 may be joined together in any suitable manner as by means of bolts 19.

Within the neck member 16 is swiveled a valve gate 20 which is adapted to co-operate with the lower portion 14 of the throat 13 during the sealing operation, and is also adapted to co-operate with said throat for the self-cleaning process. This gate 20 includes the end plates 21 and 22 whose upper ends are extended outwardly in the form of lugs 23 and 24. These lugs have their bottom faces of arcuate form and resting upon the arcuate shoulders 25 and 26 of the neck member 16. The valve 20 is also provided with an arcuate cross piece 27 which reaches between the end pieces 21 and 22 and is preferably formed integral with them. The arcuate cross piece 27 is formed on the same center or axis of rotation as that which is established by the lugs 23 and 24 resting upon their respective shoulders. Furthermore, the lower end portion 14 of the throat 13 is also formed on this same curvature so that when the valve is turned into the closed position of Figs. 1 and 2, the cross piece 27 lies close to the lower edge of the throat. Furthermore, the cross piece 27 is of sufficient size in the direction across its width to insure that its edges 28 and 29 shall extend above the lower edge of the throat, so that the lower edge of the throat lies within a pocket established by the valve when the valve is closed. This fact is clearly evident from an examination of Fig. 1.

When the valve is rocked upwardly into the dotted line position of Fig. 1, its edges 29 will entirely clear the lower edge of the throat 13 so as to completely open the throat. The valve is rocked in any convenient manner. The construction illustrated includes a rock pin 30 secured to the lug 24 extending through the side wall of the neck 16.

An operating handle 31 is secured to the projecting portion of the rock shaft 30. Said operating handle may be provided with a circular lug 32 working within a circular recess established by the flange 33 on the neck 16. If desired, a packing gland 34 may be set into the flange 33 in order to seal against gas leakage.

The operating handle 31 normally lies in the horizontal position of Fig. 1, when the valve is closed. A lug 35 (see Fig. 3) may be provided on the neck 16 in order to support the operating handle at such time.

When the valve is fully opened, the handle 31 is raised into the upright position in which it may be secured by means of a link 36 carried by the handle, and which is adapted to seat over a lug 37 on the connection 11.

In the ordinary operation of a hydraulic main, a stream of tar is continuously introduced into it, which tar flows along its bottom portion and serves to keep it clear. This tar may be introduced at the position of each ascension pipe by means of a connection 38 which reaches down through the flange 15. The connection 38, when provided, may be located alongside the position of the throat 13, so that the tar will be delivered directly onto the projecting portion 28 of the valve 20. Consequently, this valve will be kept full of tar at all times in the normal operation of the device and will effect a perfect seal when the valve is closed. When the valve is rocked for either opening or closing, it will be perfectly cleared not only of tar but of pitch or other deposit, since it will be thoroughly scraped by the lower portion of the throat 13. Since the handle 31 normally stands in horizontal position, it will keep the valve in closed position until the valve is purposely opened. Consequently, the tendency is for the valve to fall into the closed position.

If desired, a port 39 may be provided in the upper portion of the connection 11 above the position of the throat 13, through which port, when opened, may be inserted a rod or other cleaning instrument. This port is normally closed by means of a plug 40. Likewise a port 41 may be provided in the side wall of the neck 16 which is also normally closed by means of a plug 42.

Figure 2:
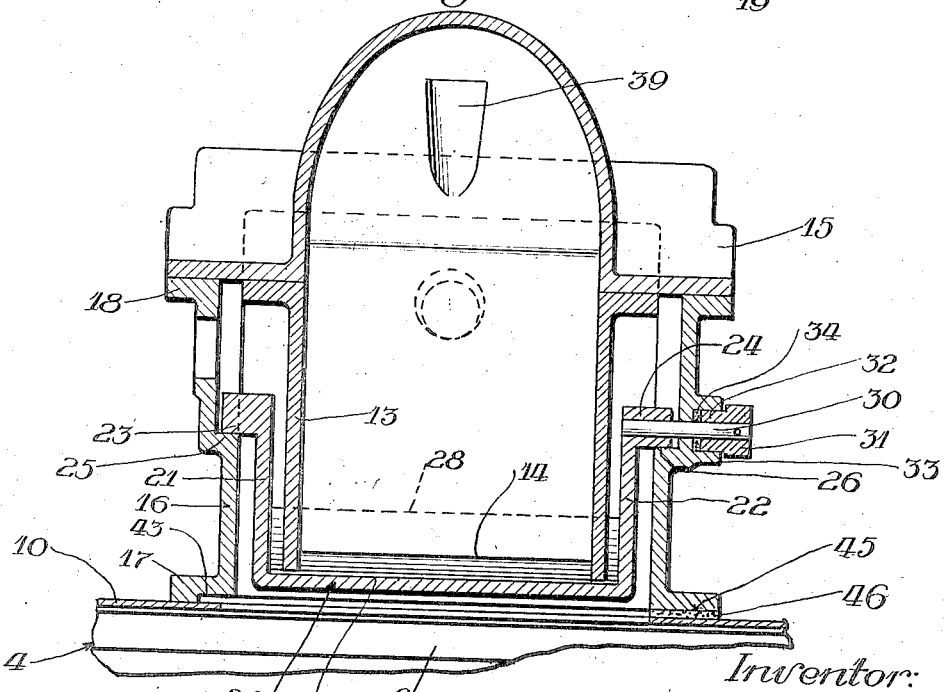
Fig. 2 shows a section taken on the line 2—2 of Fig. 1, looking in the direction of the arrows; and

In case it should be desired to remove the valve and ascension pipe from the hydraulic main without shutting down the entire bench of ovens, this can be done in the following manner: A recess 43 is provided in the flange 17 of the neck 16 at a position just above the edge of the opening in the top sheet 10 of the hydraulic main, which recess is of sufficient depth to accommodate the thickness of a plate 44, which is illustrated in Fig. 1 as having been set into place within the recess 43 and as resting upon the edge of the top sheet 10. This plate may be slid into place by reason of the fact that the recess 43 at one side of the neck 16 is cut clear through, as shown at 45 in Fig. 2. When the plate 44 is in the position shown in Fig. 1, the opening of the top sheet 10 is sealed, so that the ascension pipe or valve may be removed or repaired without substantial leakage of gas from the hydraulic main. Upon removing the sheet 44 there would be left an opening beneath the flange 17 at the point 45, through which gas might escape. This opening, however, is ordinarily closed by means of a plug of cement or grouting 46, as illustrated in Fig. 2.

While I have herein shown and described only a single embodiment of the features of my present invention, still I do not limit myself to the said embodiment except as I may do so in the claims.

I claim:

1. The combination with a hydraulic main and an ascension pipe, of a valve interposed between said main and said pipe, said valve including a throat depending downwardly from the ascension pipe towards the top of the main, a gate swingingly mounted with respect to said throat and working on a horizontal axis, said gate including end walls embracing the sides of the throat together with an arcuate connecting piece extending between said end walls and adapted to swing below the lower end of the throat when in closed position, said arcuate portion of the gate being of greater width than the width of the throat, whereby the edge portions thereof reach beyond the sides of the throat when the gate is in the lowered and closed position, a tar delivery pipe adjacent to the throat and adapted to discharge tar downwardly past the throat into the main, the gate being of such width as to normally lie within the path of the stream of tar so delivered into the main, and means for swinging the gate on its axis, substantially as described.

2. The combination with a hydraulic main and an ascension pipe, of a valve interposed between said main and said pipe, said valve including a throat depending downwardly from the ascension pipe towards the top of the main, a gate swingingly mounted with respect to said throat and working on a horizontal axis, said gate including end walls embracing the sides of the throat together with an arcuate connecting piece extending between said end walls and adapted to swing below the lower end of the throat when in closed position, said arcuate portion of the gate being of greater width than the width of the throat, whereby the edge portions thereof reach beyond the sides of the throat when the gate is in the lowered and closed position, and means for swinging the gate on its axis, substantially as described.

3. The combination with a hydraulic main and an ascension pipe, of a valve interposed between said main and said pipe, said valve including a throat depending downwardly from the ascension pipe towards the top of the main, a segmental gate swingingly mounted with respect to said throat and working on a horizontal axis and adapted to swing below the lower end of the throat when in closed position, said gate being of greater width than the width of the throat, whereby the edge portions thereof reach beyond the sides of the throat when the gate is in the lowered and closed position, a tar delivery pipe adjacent to the throat and adapted to discharge tar downwardly past the throat into the main, the gate being of such width as to normally lie within the path of the stream of tar so delivered into the main, and means for swinging the gate on its axis, substantially as described.

4. The combination with a hydraulic main and an ascension pipe, of a valve interposed between said main and said pipe, said valve including a throat depending downwardly from the ascension pipe towards the top of the main, a segmental gate swingingly mounted with respect to said throat and working on a horizontal axis and adapted to swing below the lower end of the throat when in closed position, said gate being of greater width than the width of the throat, whereby the edge portions thereof reach beyond the sides of the throat when the gate is in the lowered and closed position, and means for swinging the gate on its axis, substantially as described.

THOMAS G. KUS.